US011042152B2

(12) United States Patent
Towers

(10) Patent No.: US 11,042,152 B2
(45) Date of Patent: Jun. 22, 2021

(54) REMOTE CONTROLLED HYBRID SNOW THROWER

(71) Applicant: Kevin P. Towers, Westford, MA (US)

(72) Inventor: Kevin P. Towers, Westford, MA (US)

( * ) Notice: Subject to any disclaimer, the term of this patent is extended or adjusted under 35 U.S.C. 154(b) by 278 days.

(21) Appl. No.: 16/221,118

(22) Filed: Dec. 14, 2018

(65) Prior Publication Data

US 2019/0187693 A1    Jun. 20, 2019

Related U.S. Application Data

(60) Provisional application No. 62/598,535, filed on Dec. 14, 2017.

(51) Int. Cl.
| | | |
|---|---|---|
| *G05D 1/00* | (2006.01) | |
| *B60K 1/02* | (2006.01) | |
| *B60K 25/02* | (2006.01) | |
| *E01H 5/09* | (2006.01) | |

(52) U.S. Cl.
CPC ............ *G05D 1/0016* (2013.01); *B60K 1/02* (2013.01); *B60K 25/02* (2013.01); *E01H 5/098* (2013.01); *G05D 1/0022* (2013.01); *B60L 2200/40* (2013.01)

(58) Field of Classification Search
CPC ...... G05D 1/0016; G05D 1/0022; B60K 1/02; B60K 25/02; E01H 5/098; B60L 2200/40
See application file for complete search history.

(56) References Cited

U.S. PATENT DOCUMENTS

| | | | |
|---|---|---|---|
| 3,720,281 A | 3/1973 | Frownfelter | |
| 6,717,281 B1 * | 4/2004 | Brandon et al. ...... | B60W 10/30 290/40 C |
| 8,402,679 B2 | 3/2013 | Campbell | |
| 10,126,741 B2 | 11/2018 | Gates | |
| 2005/0039354 A1 | 2/2005 | Hanafusa et al. | |
| 2011/0094129 A1 | 4/2011 | Rowe et al. | |
| 2014/0121881 A1 | 5/2014 | Diazdelcastillo | |
| 2016/0362859 A1 | 12/2016 | Schaedler | |

(Continued)

FOREIGN PATENT DOCUMENTS

| | | |
|---|---|---|
| WO | 2010121616 A1 | 10/2010 |
| WO | 2017207823 A1 | 12/2017 |

OTHER PUBLICATIONS

SuperDroid Robots; New Custom RC 4WD Robot with Snow Blower; published Nov. 18, 2014; www.superdroidrobots.com/shop/item.aspx/new-custom-rc-4wd-robot-with-snow-blower-sold/1866/.

(Continued)

*Primary Examiner* — Tara Mayo-Pinnock
(74) *Attorney, Agent, or Firm* — Venable LLP; Michele V. Frank

(57) ABSTRACT

A gasoline powered walk behind snow removal device modified to include drive motors and a linear actuator controlled snow discharge chute to provide a remote controlled snow removal device. The modification includes a control unit mounted to the handle or frame structure to remotely control the snow removal device using a hand held wireless system. The drive includes a single piece mounting bracket or pair of mounting brackets fastened to the frame structure. The mounting brackets receive a pair of motor brackets and motors to drive a first drive wheel and a second drive wheel disposed on opposing sides of the frame structure.

30 Claims, 11 Drawing Sheets

(56) References Cited

U.S. PATENT DOCUMENTS

2017/0175351 A1    6/2017  Mast et al.
2018/0217587 A1*   8/2018  Gates .................. A01D 34/008
2019/0003137 A1*   1/2019  Gao etal. ............. G01S 15/931
2019/0323190 A1*  10/2019  Waelbers et al. .... G05D 1/0011

OTHER PUBLICATIONS

International Search Report and Written Opinion issued in related International Patent Application No. PCT/US2018/065788 dated Mar. 7, 2019.

* cited by examiner

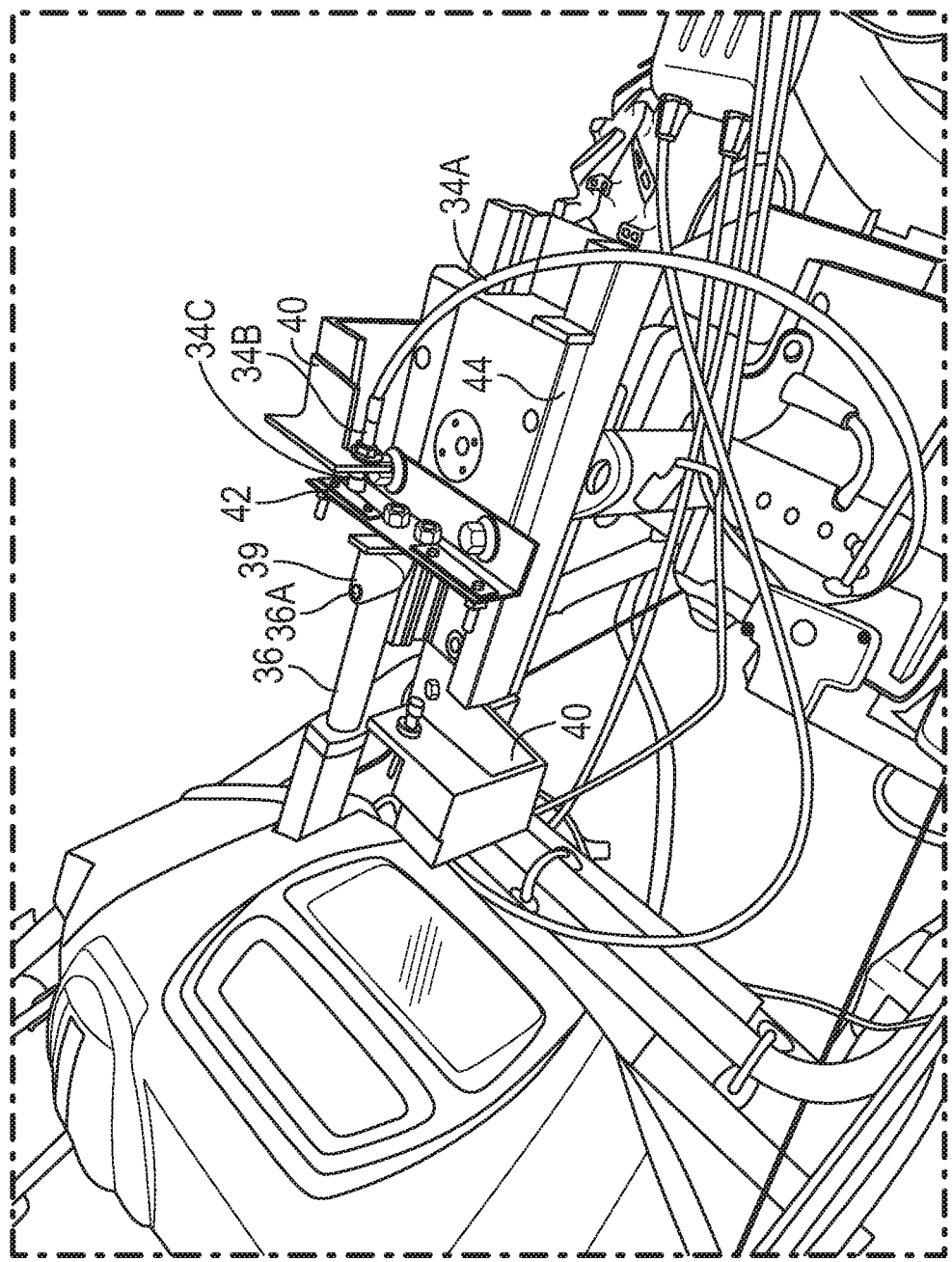

REMOTE CONTROLLED HYBRID SNOW THROWER

CROSS-REFERENCE TO RELATED APPLICATIONS

The present application claims priority benefit to U.S. Provisional Patent Application No. 62/598,535 filed on Dec. 14, 2017, the entire content of which is incorporated herein by reference.

BACKGROUND

1. Technical Field

Some embodiments of the present invention relate to snow blowers or snow throwers and more particularly to a remote controlled hybrid snow blower or thrower.

2. Discussion of Related Art

Snow removers, snow throwers or snow blowers are typically used in the winter months to remove snow accumulation on residential pavements, driveways or walkways or commercial walkways and entrances. These machines require an operator to walk behind the machine and control the speed, direction of travel and the direction of the snow discharge chute. These machines are typically propelled by a drive system powered by an engine, while the auger and impeller is powered by the engine to discharge the snow through the snow discharge chute. The speed and direction of motion, as well as a direction of snow discharge chute are manually controlled by an operator or user walking behind the machine. Typically, the operator manually switches a direction of the snow discharge many times during the snow removal process from a desired area such as a driveway, a walkway, etc. depending on the driving direction of the snow thrower and/or depending on surrounding objects and/or structures.

This can be cumbersome to the operator or user and difficult due to exposure to the elements and risks of slipping and falling. Although some of these machines are designed to be self-propelled, they require some physical effort to maneuver and therefore cannot be operated by everyone, especially a disabled or a physically weak person.

Therefore, a need remains for a snow thrower that solves the above and other problems associated with snow removal.

SUMMARY OF THE DISCLOSURE

An aspect of the present disclosure is to provide a remote controlled hybrid snow thrower. The remote controlled hybrid snow thrower comprises a frame structure; a plurality of drive wheels or drive tracks mounted to the frame structure; an auger and an auger enclosure mounted to the frame structure, the auger being configured to remove snow from inside the auger enclosure; a snow discharge chute mounted to the frame structure and configured to direct snow away from the remote controlled hybrid snow thrower; and an engine mounted to the frame structure and configured to power the auger. The remote controlled hybrid snow thrower further includes one or more electric motors mounted to the frame structure and operatively coupled to the plurality of drive wheels or drive tracks, the one or more electric motors being configured and arranged to drive the plurality of drive wheels or drive tracks; and a control unit mounted to the frame structure and configured to control the one or more electric motors to drive the plurality of drive wheels or drive tracks and to control an orientation of the snow discharge chute, the control unit being configured to receive command signals wirelessly from a handheld wireless device of a user so as to remotely control an operation of the remote controlled hybrid snow thrower. The remote controlled hybrid snow thrower also includes a control switch in communication with the one or more electric motors, the control switch being configured to turn off or turn on electrical power to the one or more electric motors or turn off or turn on command input signals to the electric motors from the control unit. When the control switch is turned off, electrical power to the one or more electric motors or the command input signals to the electric motors from the control unit, or both, are turned off and the snow thrower is set for manual operation such that the plurality of drive wheels or drive tracks are set to be driven by the engine. When the control switch is turned on, the electrical power to the one or more electric motor or the command input signals to the electric motors from the control unit, or both, are turned on and the snow thrower is set for remote control operation such that the plurality of drive wheels or drive tracks are set to be driven by the electric motors.

Another aspect of the present disclosure is to provide a conversion kit for transforming a manually operable snow thrower into a remotely controllable snow thrower. The conversion kit includes one or more electric motors configured to be mounted to a frame structure of the manually operable snow thrower and configured to be operatively coupled to a plurality of drive wheels or drive tracks of the manually operable snow thrower, the one or more electric motors being configured to drive the plurality of drive wheels or drive tracks; and a control unit configured to be mounted to the frame structure and configured to control the one or more electric motors to drive the plurality of drive wheels or drive tracks, the control unit being further configured to control an orientation of a snow discharge chute of the manually operable snow thrower, the control unit being configured to receive command signals wirelessly from a handheld wireless device of a user so as to remotely control an operation of the manually operable snow thrower so as to transform the manually operable snow thrower into a remotely controllable snow thrower. The conversion kit also includes a control switch configured to be in communication with the one or more electric motors, the control switch being configured to turn off or turn on electrical power to the one or more electric motors or turn off or turn on command input signals to the electric motors from the control unit. When the switch is turned off, electrical power to the one or more electric motors or the command input signals to the electric motors from the control unit, or both, are turned off and the remotely controllable snow thrower is set for manual operation such that the plurality of drive wheels or drive tracks are set to be driven by an engine of the manually operable snow thrower. When the switch is turned on, the electrical power to the one or more electric motor or the command input signals to the electric motors from the control unit, or both, are turned on and the remotely controllable snow thrower is set for remote control operation such that the plurality of drive wheels or drive tracks are set to be driven by the electric motors.

Another aspect of the present disclosure is to provide a method of transforming a manually operable snow thrower into a remotely controllable snow thrower. The method includes mounting one or more electric motors to a frame structure of the manually operable snow thrower and operatively coupling the one or more electric motors to a plurality of drive wheels or drive tracks of the manually operable snow thrower, the one or more electric motors being configured to drive the plurality of drive wheels or drive tracks. The method also includes mounting a control unit to the frame structure, the control unit being configured to receive command signals wirelessly from a handheld wireless device of a user so as to remotely control an operation of the manually operable snow thrower so as to transform the manually operable snow thrower into a remotely controllable snow thrower. The method further includes electrically connecting the control unit to the one or more electric motors so as to enable control the one or more electric motors to drive the plurality of drive wheels or drive tracks; and electrically connecting the control unit to a discharge chute control mechanism to enable the control unit to control the discharge chute control mechanism to change an orientation of a snow discharge chute of the manually operable snow thrower. The method also includes enabling turning off or turning on electrical power to the one or more electric motors or turning off or turning on command input signals to the electric motors from the control unit using a switch in communication with the one or more electric motors; setting for manual operation the remotely controllable snow thrower such that the plurality of drive wheels or drive tracks are set to be driven by an engine of the manually operable snow thrower when the switch is turned off and electrical power to the one or more electric motors or the command input signals to the electric motors from the control unit, or both, are turned off; and setting for remote control operation the remotely controllable snow thrower such that the plurality of drive wheels or drive tracks are set to be driven by the electric motors when the switch is turned on and the electrical power to the one or more electric motor or the command input signals to the electric motors from the control unit, or both, are turned on.

BRIEF DESCRIPTION OF THE DRAWINGS

The present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

FIG. 4 shows a close up view of a snow discharge chute control mechanism of the remote controlled snow thrower, according to an embodiment of the present disclosure;

DETAILED DESCRIPTION

Figure 1:
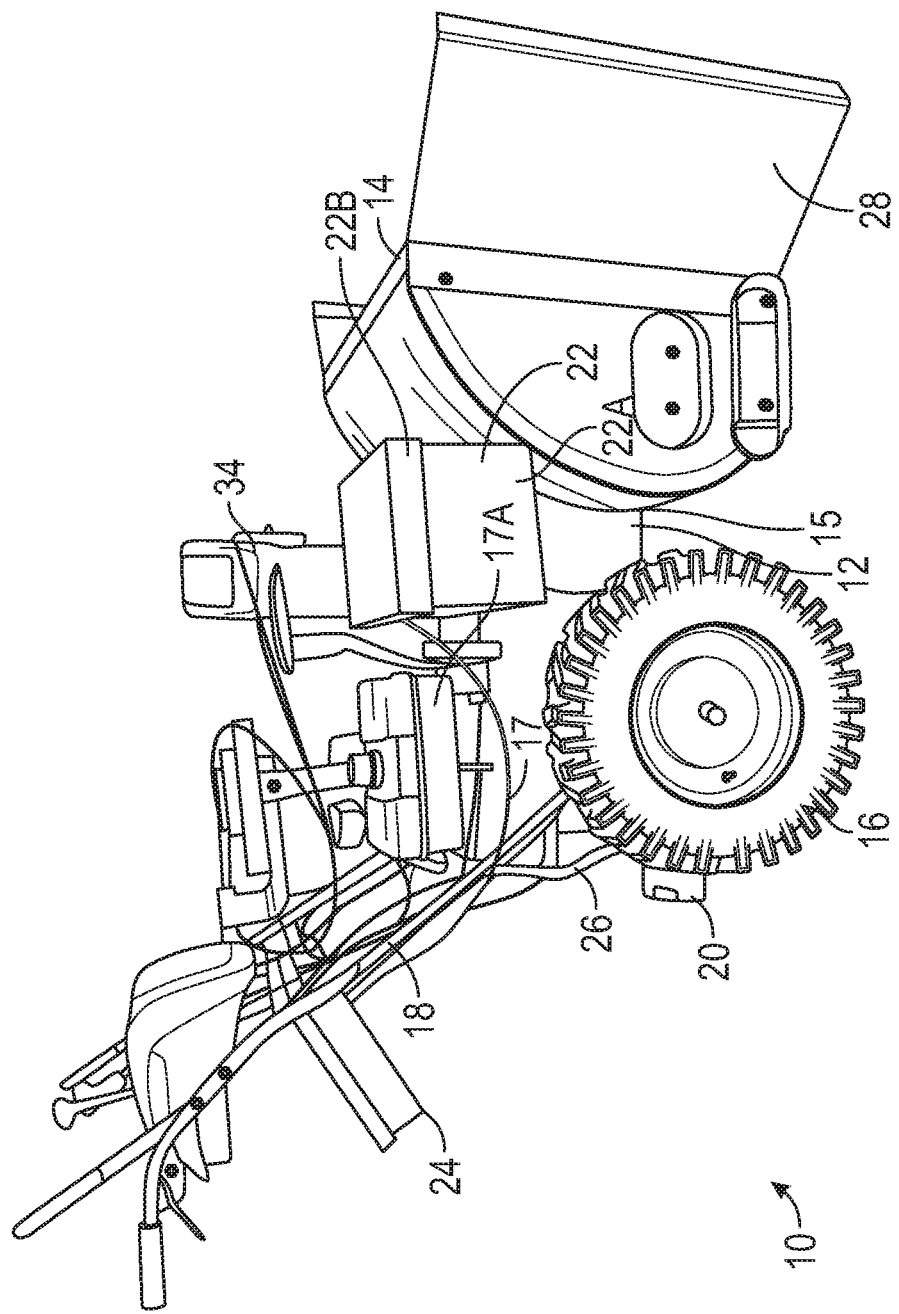
FIG. 1 shows a side view of a remote controlled snow thrower, according to an embodiment of the present disclosure.

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited anywhere in this specification are incorporated by reference as if each had been individually incorporated.

According to some aspects of the present disclosure there is provided a remotely operated snow thrower or snow blower which can be operated from a convenient distance without physically walking behind the snow thrower or blower and without being exposed to the elements. Personal wireless devices (for example, BLUETOOTH capable devices, or Radio Frequency active devices) such as smart phones and tablet computers are widely used in today's world. These devices can have a typical communication range up to about 100 feet. A snow removal machine or a snow thrower can be provided with a wireless receiver for controlling the operation of the snow removal machine. The wireless receiver on the snow removal machine can receive wireless signals from a personal wireless device. Therefore, the snow removal machine can be operated remotely as a robot while being remotely monitored at a safe distance to ensure a safe snow removal operation. In some embodiments, for example, one or more wireless cameras (e.g., WiFi cameras) 100 (shown in FIG. 2) can be installed on the snow removal machine to monitor progress of snow removal. For example, the one or more wireless cameras 100 installed on a structure of the snow thrower 10 can be configured to transmit images wirelessly to the user of the snow thrower. For example, the one or more wireless cameras 100 can be configured to transmit images of surroundings of the snow thrower 10 to the wireless personal device 50 of the user. Alternatively or in addition, one or more land-based cameras can also be located strategically around the snow removal area. For example, in an embodiment, the one or more land-based cameras can be one or more wireless cameras. In this way, a user can monitor the snow removal process from the comfort of a home. In an embodiment, the snow thrower 10 may also include one or more proximity sensors 102 installed on a structure of the snow thrower 10. The one or more proximity sensors 102 (shown in FIG. 3) are connected to the control unit 24 of the snow thrower 10 and configured to reorient a travel direction of the snow thrower, cutoff power to the plurality of drive wheels or drive tracks, or trigger an alarm to the user, or any combination thereof.

FIG. 1 shows a side view of a remote controlled snow thrower 10, according to an embodiment of the present disclosure. The snow thrower 10 comprises a frame structure 12, an auger enclosure 14 mounted to the frame structure 12, and drive wheels 16 mounted to the frame structure 12. An auger 13 (shown in FIG. 6) for removing snow is provided inside the auger enclosure 14. The snow thrower 10 further includes an electric or a gasoline powered engine 17 mounted to the frame structure 12. In the embodiment shown in FIG. 1, the engine 17 is a gasoline powered engine and the snow thrower 10 includes gas tank or reservoir 17A for powering the gasoline powered engine 17. The engine 17 is configured and arranged to power the auger 13 (shown in FIG. 6) provided within the auger enclosure 14. In the embodiment shown in FIG. 1, the snow thrower 10 also includes a handle 18 mounted to the frame structure 12. Various control systems and mechanism are provided and mounted to the handle 18. Although the handle 18 is provided in the embodiment shown, the various control systems and mechanisms can be mounted directly onto the frame structure 12. In addition, the term "handle" 18 is used herein to encompass any structure that can be used to mount the various control systems and mechanisms. Although the snow thrower 10 is shown having drive wheels 16, the snow thrower 10 may also be provided with drive tracks (also known as "track drive") instead of the drive wheels 16, as is known in the engineering field of snow throwers.

Figure 11:
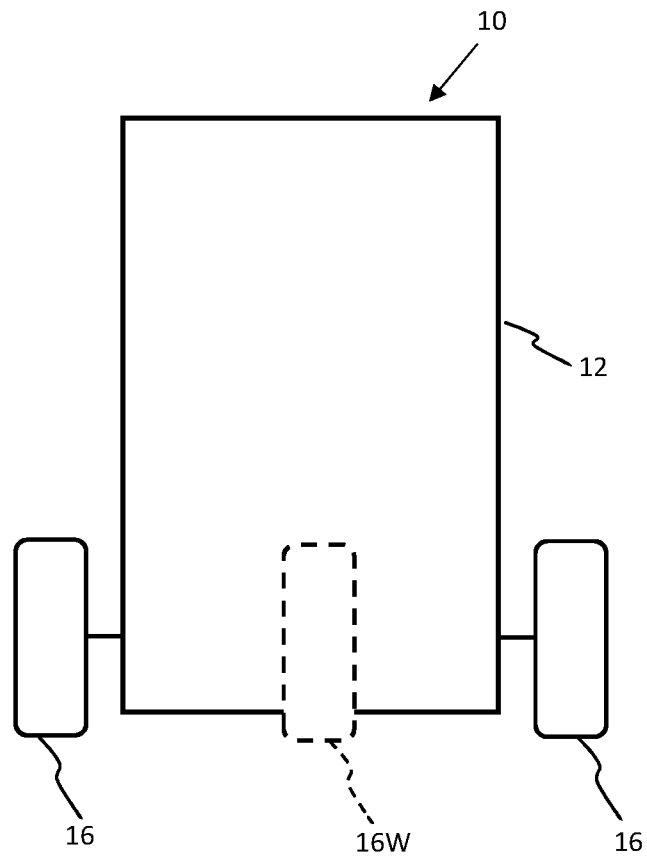
FIG. 11 shows a schematic representation of the snow thrower having a third wheel provided between two drive wheels of the snow thrower, according to an embodiment of the present disclosure.

In addition, although two drive wheels 16 are shown in the figures of the present disclosure, in an embodiment, a third wheel 16W or stabilization wheel (shown in FIG. 11) can be provided between the two shown drive wheels 16 mounted to the frame structure 12 of the snow thrower 10. The third wheel may be provided to enhance weight stability for the snow thrower 10. In an embodiment, the third wheel can be driven by the electric motors 20. However, in another embodiment, the third wheel can be a "free" wheel in that it is not driven by a motor and is simply provided to enhance stability, handling, maneuverability, etc. In an embodiment, the third wheel can be configured to be adjustable in height to facilitate lifting and storage the snow thrower 10 by the user or operator.

In an embodiment, one or more lift actuators are provided on the snow thrower 10. In an embodiment, the one or more lift actuators can be provided about a mid-section of the snow thrower 10, for example, at an impeller enclosure 15 containing an impeller operatively connected to the auger. The one or more lift actuators are configured to lift the snow thrower. For example, the one or more lift actuator can be used for storing the snow thrower 10 or for moving the snow thrower from a lower position to a higher position.

Figure 10:
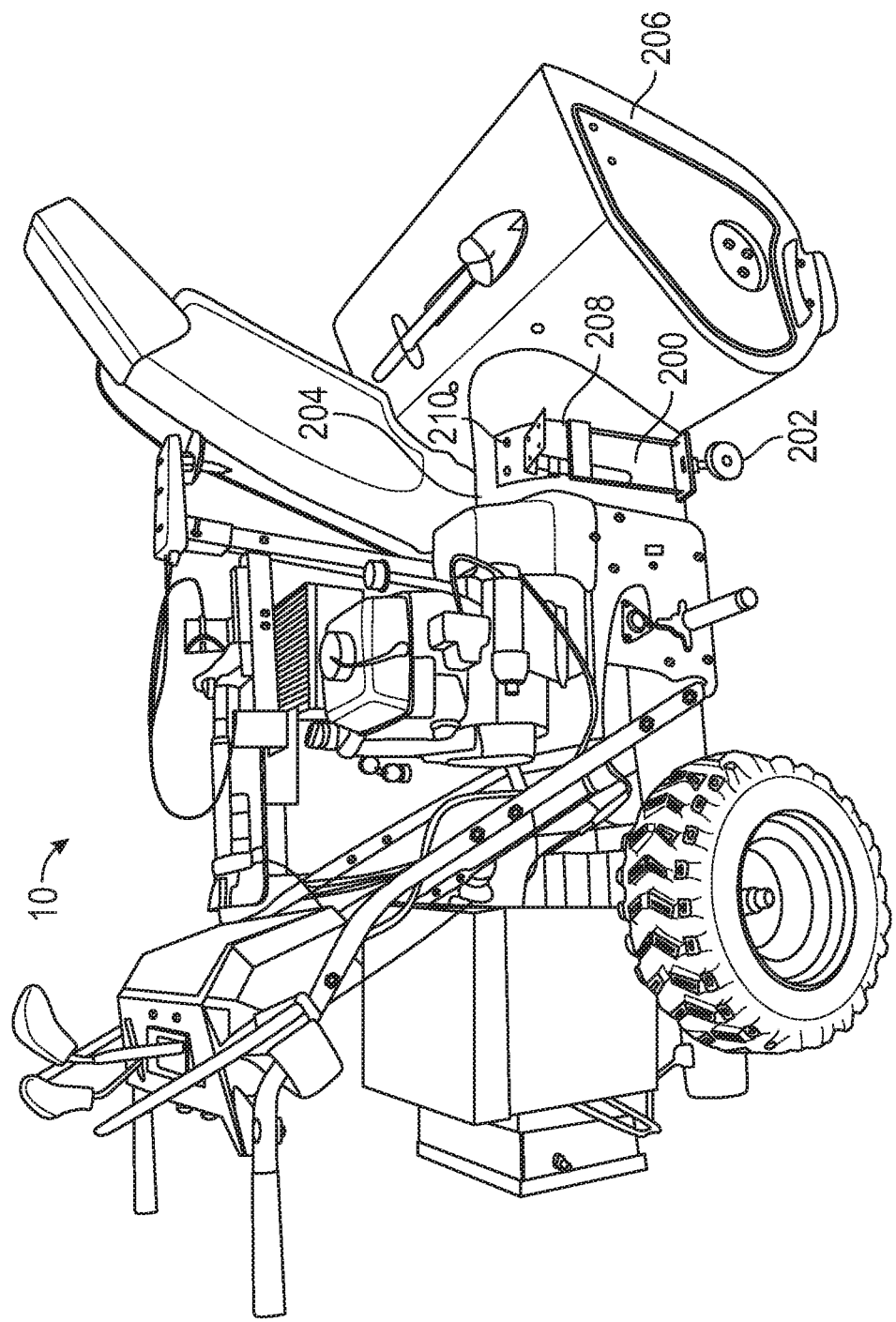
FIG. 10 shows a perspective view of the snow thrower having a one or more lifting actuators provided with wheels, according to an embodiment of the present disclosure.

FIG. 10 shows a perspective view of the snow thrower having a pair of lifting wheel brackets 200 provided with wheels, according to an embodiment of the present disclosure. In an embodiment, the one or more lifting wheel brackets 200 comprise a pair of lifting wheels 202 installed on opposing sides of the impeller enclosure 204 to enable lifting of a front end 206 of the snow thrower 10. The pair of lifting wheels 202 are configured to be lowered or raised as needed using a pair of remote controlled tracked linear actuators 208 to enable lifting the front end 206 of the snow thrower 10.

When the snow thrower 10 is required to be moved indoors (for example) for storage or to a higher position, it may be convenient to lift the front end 206 of the snow thrower 10 to facilitate moving of the snow thrower 10. An impeller enclosure bracket 210 is provided and strapped to the impeller enclosure 204 on opposing sides. Tracked linear actuators 208 are mounted onto the impeller enclosure bracket 210. In an embodiment, the tracked linear actuator 208 can be, for example, track linear actuator model PA18, manufactured by Progressive Automations. The tracked linear actuators 208 are connected to a pair of lifting wheel brackets 200 mounted to the slider tracks which in turn are connected to the lifting wheels 202. This enables the lifting wheels 202 to be raised or lowered, thereby lifting the front end 206 of the snow thrower 10. In an embodiment, the one or more tracked linear actuators 208 are activated using a remote control together with an accompanying control unit to which the tracked linear actuators 208 are plugged into.

As shown in FIG. 1, the snow thrower 10 further includes electric motors 20 (e.g., geared electric motors). The electric motors 20 are mounted to the frame structure 12 and operatively coupled to the drive wheels 16. The electric motors 20 are configured and arranged to drive the drive wheels 16. In an embodiment, two electric motors 20 are provided to drive corresponding drive wheels 16 independently or separately. For example, a first electric motor is configured to drive a first drive wheel and a second electric motor is configured to drive a second drive wheel. In this way, the snow thrower 10 can be turned left/right (battle tank-style) by providing more or less rotation to each of the drive wheels 16. The electric motors 20 are powered by one or more batteries 22. The one or more batteries 22 are provided in a battery housing 22A having a cover 22B. The battery housing 22A can be mounted directly above the auger enclosure 14. In an embodiment, the battery housing 22A is positioned so as to provide stability to the snow thrower 10 during a snow removal operation. In addition, the battery housing 22A is positioned so as not to interfere with a discharge of snow. The battery housing 22A may alternatively be positioned on the frame structure 12 of the snow thrower or on the mounting brackets (while maintaining the stability of the snow thrower). In an embodiment, the battery housing 22A is provided with venting holes (not shown) to allow for proper venting of the one or more batteries 22. In an embodiment, the battery housing 22A and/or the cover 22B can be made of various materials such as, but not limited to, metal, aluminum, stainless steel, plastic, fiber glass or any combination thereof. Although two electric motors are described herein being used to power each drive wheel 16 of the snow thrower 10, as it can be appreciated, a single electric motor can be used instead. In which case both drive wheels 16 can be powered by the single electric motor. However, in this case an additional mechanism must be provided to allow independent control of each wheel. In an embodiment, the snow thrower 10 is a hybrid snow thrower in that the auger 13 can be powered by a gasoline powered engine 17 whereas the drive wheels 16 are powered by the electric motors 20.

In an embodiment, the one or more batteries 22 include two 12 Volt rechargeable batteries (e.g., Gel batteries), connected in series to provide 24 Volts of Direct Current (DC) power supply to the electric motors 20. In other embodiments, the one or more batteries 22 may include other types of rechargeable batteries such as, but not limited to, Nickel Cadmium, Lithium-ion, and Lead Acid batteries.

The snow thrower 10 also includes a control unit 24 that is configured to control the electric motors 20 and a discharge chute rotation mechanism 35. In an embodiment, the control unit 24 is fastened to the snow thrower handle 18 using appropriate fasteners (e.g., U-bolts). In other embodiments, the control unit 24 may be located elsewhere on the snow thrower 10 and fastened using alternate fastening methods. FIG. 8 shows a schematic diagram of the control unit 24, according to an embodiment of the present disclosure. As shown in FIG. 8, the control unit 24 includes a micro-controller 24A, a wireless receiver (e.g., BLUETOOTH receiver, Radio Frequency receiver, etc.) 24B in communication with the micro-controller 24A, and a motor controller 24C in communication with the micro-controller 24A. Electrical cables 26 are provided to connect the electric motors 20 to the motor controller 24C of the control unit 24. A wireless personal device 50 (shown in FIG. 7) such as a smart phone, a tablet computer, a laptop computer, etc. operated by a user is configured to send command signals wirelessly ((for example, using BLUETOOTH or Radio signals) to the wireless receiver 24B (e.g., a BLUETOOTH receiver) in the control unit 24 to remotely control the operation of the snow thrower 10. The wireless receiver 24B in the control unit 24 is configured to receive command signals from the wireless personal device 50 (shown in FIG. 7). The command signals may include direction and speed control signals. The command signals sent by the wireless personal device 50 and received by the wireless receiver 24B in the control unit 24 are processed by the micro-controller 24A in the control unit 24 to generate processed signals. The processed signals are then transmitted to the motor controller 24C which in turn sends motor input signals via electrical cables 26 to the electric motors 20 to drive the electric motors 20. However, alternatively, some motor controllers are capable of directly processing signals from radio frequency receivers without the need of a micro-controller. Therefore, in some embodiments, the micro-controller 24A may not be needed and the command signals received by the wireless receiver 24B are directly sent to drive the electric motors 20.

As shown in FIG. 8, a switch 27 is provided to turn OFF/ON electrical power to the electric motors 20 or turn OFF/ON command input signals to the electric motors 20 from the control unit 24, or both, if desired by the operator. When the switch 27 is turned OFF, the electric motors 20 do not receive electric power or do not receive command input signals, or both. Hence, in this case, the snow thrower 10 cannot be controlled remotely. However, the snow thrower 10 can still be operated manually by a user or operator. In this instance, the drive wheels 16 are not driven by the electric motors 20 and are instead driven by the engine 17 (e.g., gasoline engine) that is used to drive the auger 13. A manual lever is provided on the snow thrower 10 to link the engine transmission to the drive wheels 16. When the snow thrower 10 is set for manual operation, the electric motors 20 are turned OFF or the electric command signals are turned OFF, or both, by turning switch 27 to OFF state. Hence, in this manual configuration, the drive wheels 16 are not driven by the electric motors 20. On the other hand, when the snow thrower 10 is set for remote operation, the electric motors 20 are switched ON by turning ON the switch 27 while the operator switches to using the electrical motors by not engaging the manual lever. In this remote control configuration, the electric motors 20 are configured to be remotely controlled to drive the drive wheels 16.

Figure 2:
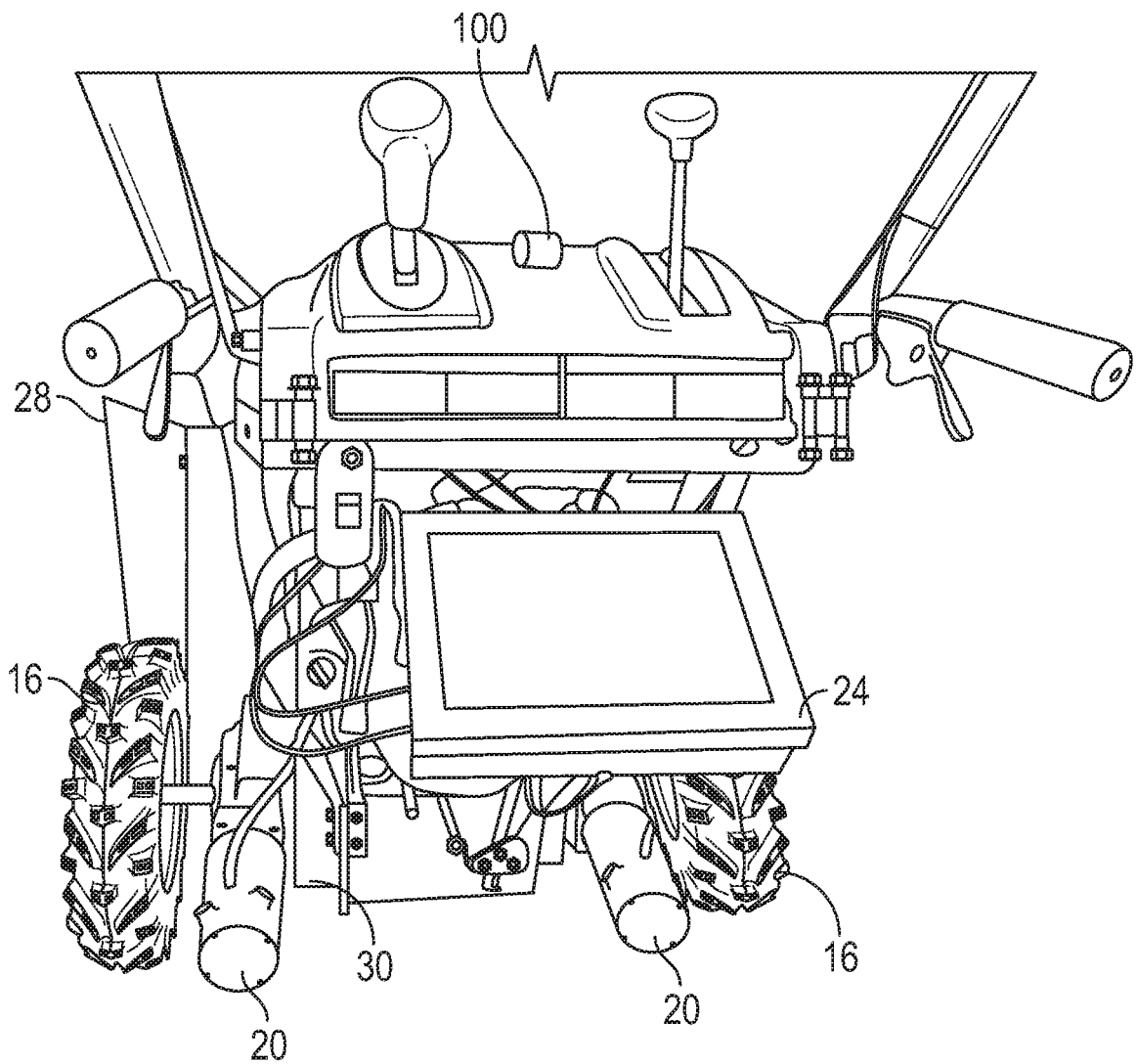
FIG. 2 shows a rear view of the remote controlled snow thrower, according to an embodiment of the present disclosure.
Figure 5A:
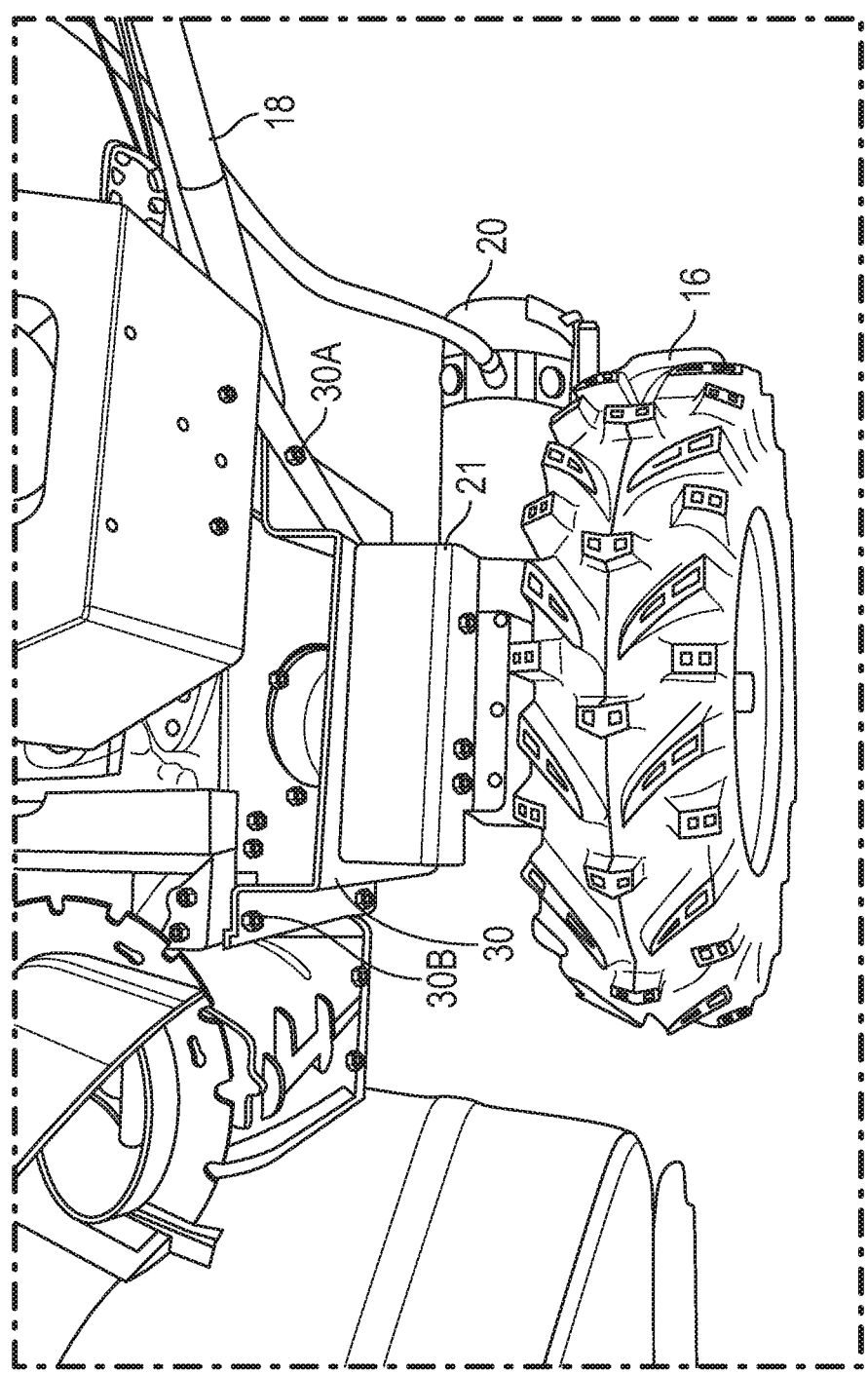
FIGS. 5A and 5B show top views of a drive system for the remote controlled snow thrower, according to an embodiment of the present disclosure.

FIG. 2 shows a rear view of the remote controlled snow thrower 10, according to an embodiment of the present disclosure. In an embodiment, the drive wheels 16 are spaced apart from the centerline of the snow thrower 10 so as provide enough space for mounting the electric motors 20. The spacing is provided to allow for external mounting of the electric motors 20 to the frame structure 12 of the snow thrower 10 and mounting brackets 30 used for mounting the electric motors 20 to the frame structure 12 of the snow thrower 10. Each electric motor 20 is mounted to the frame structure 12 of the snow thrower 10 using a separate mounting bracket 30. In an embodiment, each mounting bracket 30 is fastened to the frame structure 12 of the snow thrower 10 using fasteners 30A used to attach the handle 18 to the frame structure 12 and frame fasteners 30B on the sides of the snow thrower, as shown in FIG. 5A. In an embodiment, a pair of mounting brackets 30 is provided, one on the left side and the other on the right side of the snow thrower 10. In an embodiment, the mounting brackets 30 are identical, except that each is a mirror image of the other. In other embodiments, custom mounting brackets to suit the frame and mounting configuration for the type of snow thrower 10 can also be used.

Figure 3:
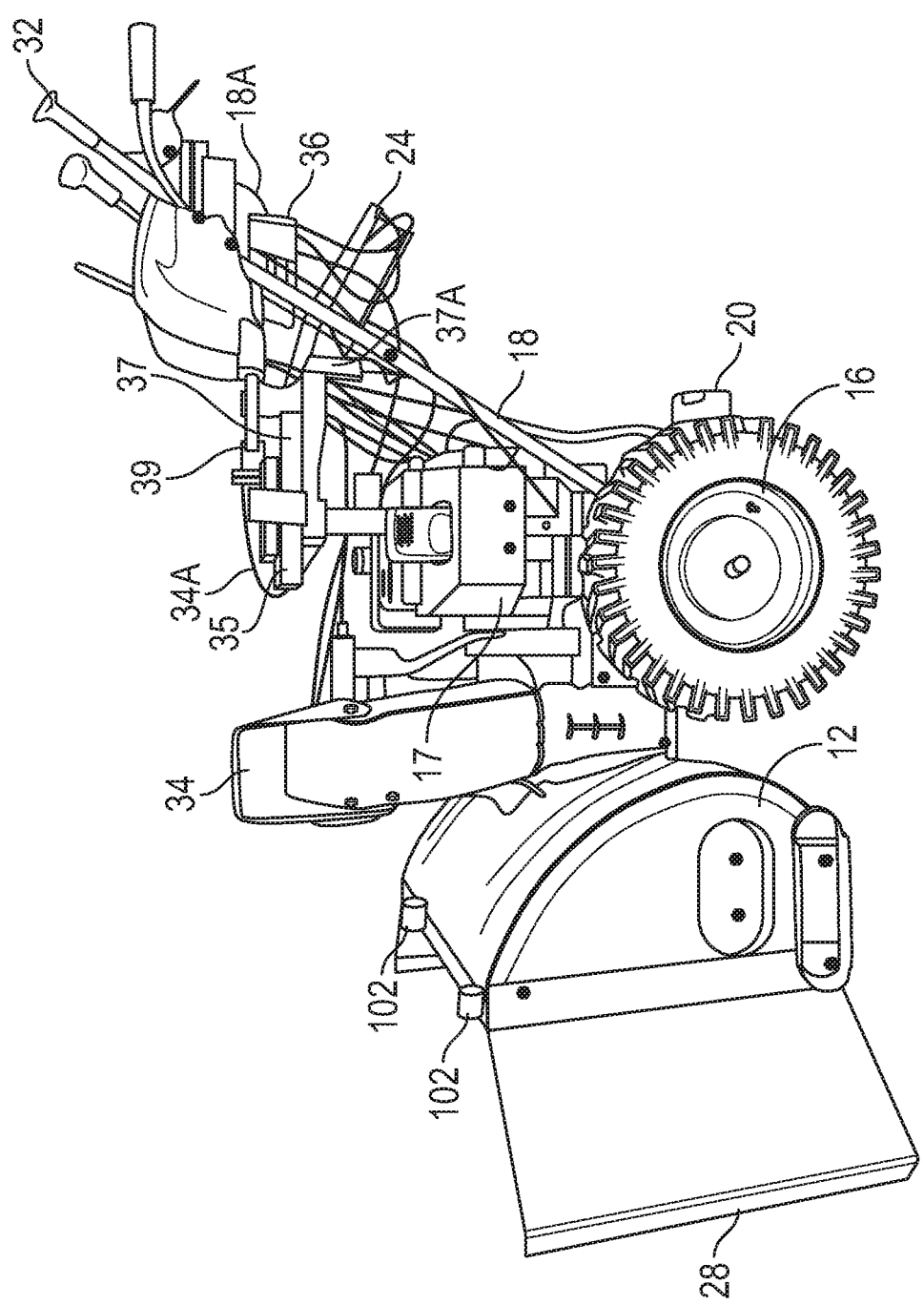
FIG. 3 shows another side view of the remote controlled snow thrower, according to an embodiment of the present disclosure.

FIG. 3 shows another side view of the remote controlled snow thrower 10, according to an embodiment of the present disclosure. In an embodiment, the snow thrower 10 may also include an auger lever 32 located on the handle 18 that can be engaged to start the auger 13 (shown in FIG. 6). A user may engage the auger lever 32 which starts the auger 13 and impeller (shown in FIG. 6) inside the auger enclosure 14 that rotates at relatively high speed. The auger 13 picks up snow which is discharged through a snow discharge chute 34 mounted to the frame structure 12 of the snow thrower 10. The snow discharge chute is configured to direct discharged snow away from the snow thrower 10 to a desired location. The snow thrower 10 also includes a discharge chute control mechanism 35 configured to orient (e.g., rotate) the snow discharge chute 34 so as to throw snow to a desired location. In an embodiment, the control unit 24 is configured to control the discharge chute control mechanism 35 in accordance with command signals received wirelessly from the wireless personal device 50. In an embodiment, the discharge chute control mechanism 35 includes a linear actuator 36 and a slider mechanism 37. The linear actuator 36 is configured to move the slider mechanism 37 and the slider mechanism 37 is configured to extend or retract a chute control cable 34A attached to the snow discharge chute 34 to orient the snow discharge chute 34 to throw snow to the desired location. A fixed end of the linear actuator 36 is attached to the snow thrower handle 18 using an actuator mounting bracket attached to a handle bracket 18A. A rod end of the linear actuator 36 is attached to an actuator mounting bracket 39. A slider track of the slider mechanism 37 is attached to a slider support bracket 37A which is attached to the snow thrower handle 18. As shown in FIG. 3, the snow discharge chute 34 is facing to the left when the linear actuator 36 is in the extended position. When the linear actuator 36 retracts, the snow discharge chute 34 is rotated to the right using the chute control cable 34A and the slider mechanism 37, as further illustrated in FIG. 4.

FIG. 4 shows a close up view of the discharge chute control mechanism 35 of the snow thrower 10, according to an embodiment of the present disclosure. Adjuster ends 34B of the chute control cable 34A are attached to end brackets 40 and the heads 34C of the chute control cable 34A are attached to a slider bar 42 of the slider mechanism 37. A rod end 36A of the linear actuator 36 is attached to an actuator mounting bracket 39 which in turn is attached to the slider bar 42. The actuator mounting bracket 39 is attached to the slider bar 42 which in turn is attached to the slider 44 of the slider mechanism 37. When the linear actuator 36 is in extended position as shown, the left end of the chute control cable 34A is extended, causing the snow discharge chute to turn left. When the linear actuator 36 is retracted, it will pull the chute control cable 34A in the opposite direction, causing the snow discharge chute to turn right. Although the discharge chute control mechanism 35 is depicted herein as including a linear actuator 36 and a slider mechanism 37. In another embodiment, the slider mechanism 37 may be eliminated, in which case a tracked linear actuator can be used in place of the linear actuator 36 and slider mechanism 37. An example of a tracked linear actuator that can be used for this purpose include track linear actuator model PA18, manufactured by Progressive Automations.

Figure 5B:
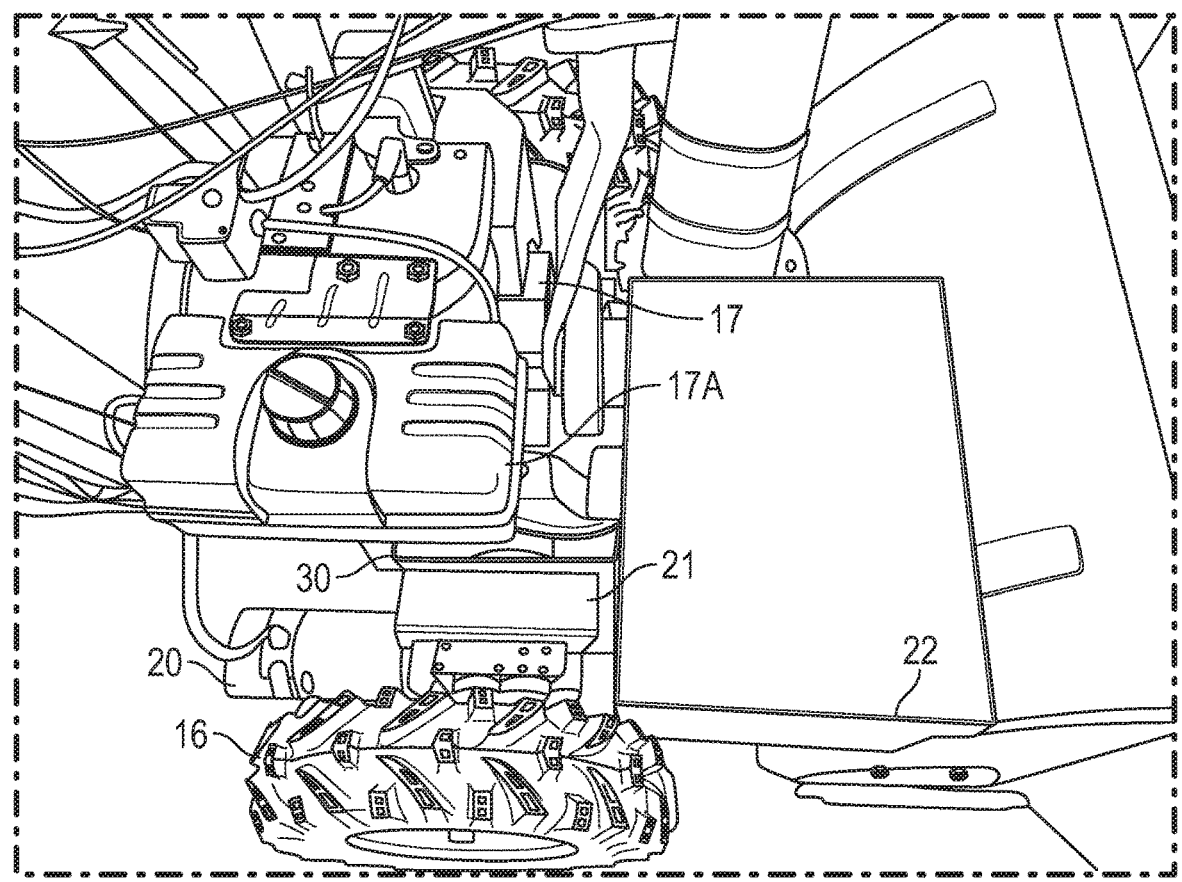

FIGS. 5A and 5B show top views of a drive system for the remote controlled snow thrower 10, according to an embodiment of the present disclosure. In an embodiment, the pair of mounting brackets 30 are mounted on the frame structure 12 of the snow thrower 10 using two handle fasteners 30A and two frame fasteners 30B. Although two handle fasteners 30A and two frame fasteners 30B are shown used herein, as it can be appreciated, one or more fasteners can also be used depending on the mounting configuration of the mounting brackets 30 on the frame structure 12 of the snow thrower 10. In an embodiment, the electric motors 20 are mounted on to the motor brackets 21. The motor brackets 21 are fastened to the mounting brackets 30. In an embodiment, the pair of mounting brackets 30 include a left side bracket and a right side bracket which are identical except each mounting bracket being a mirror image of the other. Other embodiments may include mounting brackets 30 and motor brackets 21 with alternate mounting locations on the frame structure 12 of the snow thrower 10. Alternatively, the mounting brackets 30 and the motor brackets 21 can be integrated into single unitary brackets to perform the function of both mounting brackets 30 and motor brackets 21.

Figure 6:
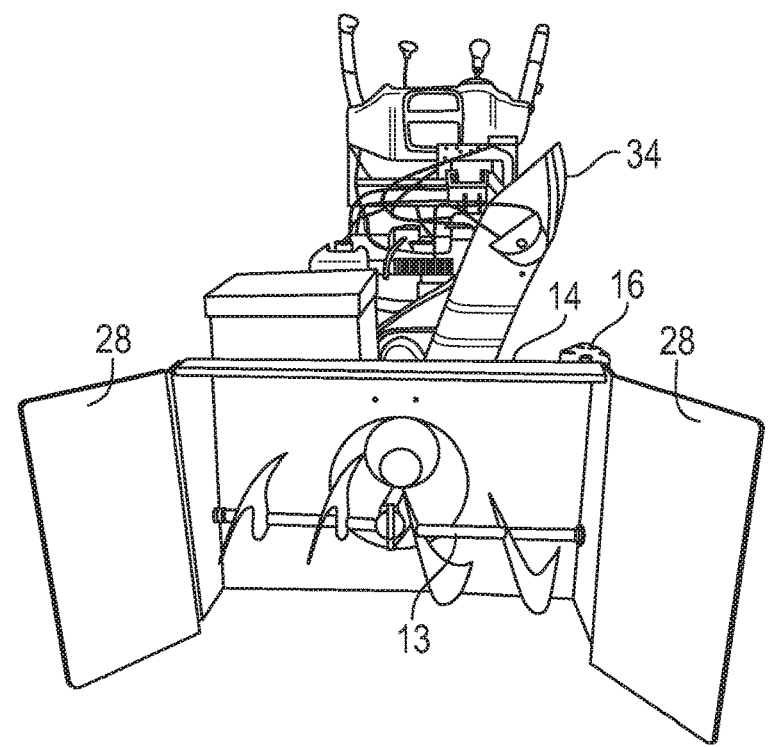
FIG. 6 shows a front view of the remote controlled snow thrower, according to an embodiment of the present disclosure.

FIG. 6 shows a front view of the remote controlled snow thrower 10, according to an embodiment of the present disclosure. As shown in FIG. 6, the snow thrower 10 includes a pair of extension flaps 28 fastened to two sides of the auger enclosure 14. The extension flaps 28 help direct the snow towards the center of the auger enclosure 14. The extension flaps 28 are also used to clear a path for the snow thrower drive wheels 16 as the snow thrower moves forward. In another embodiment, the pair of extension flaps 28 may be eliminated when the drive wheels 16 are disposed closer to the centerline of the snow thrower 10. Indeed, a snow path can be cleared by the auger enclosure 14 for the drive wheels 16 as the drive wheels 16 are directly located behind the auger enclosure 14.

Figure 7:
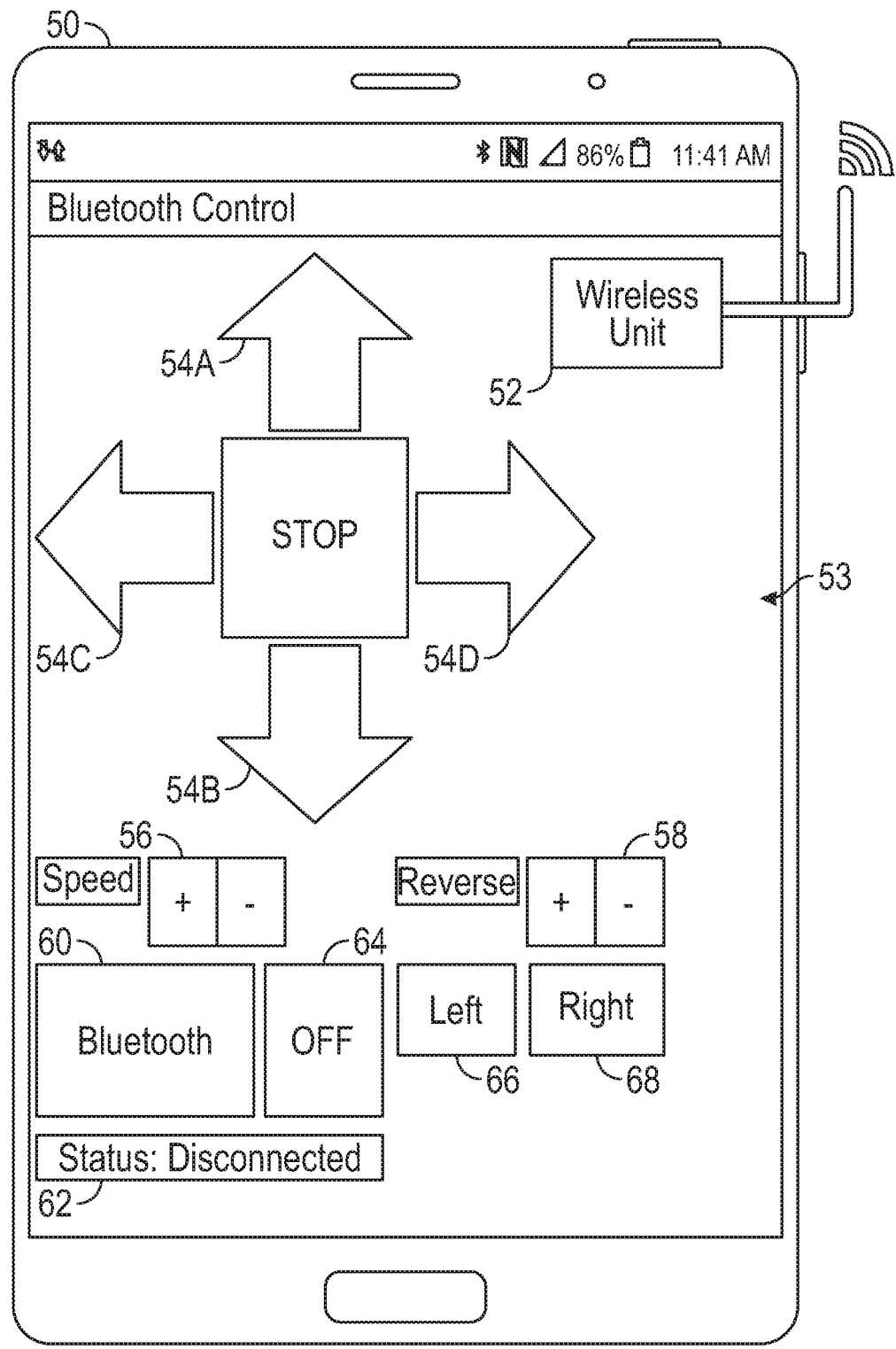
FIG. 7 shows a wireless personal device for controlling the remote controlled snow thrower, according to an embodiment of the present disclosure.
Figure 8:
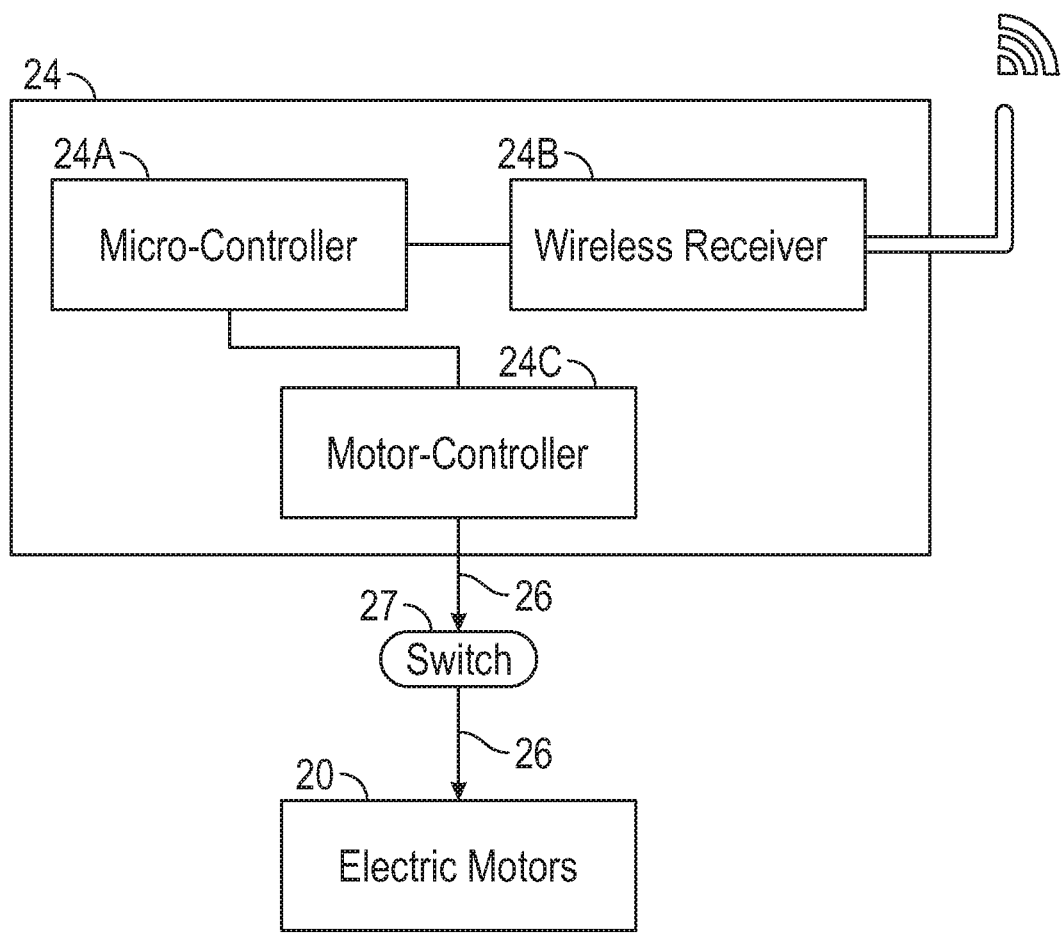
FIG. 8 shows a schematic diagram of a control unit of the remote controlled snow thrower, according to an embodiment of the present disclosure.

FIG. 7 shows a wireless personal device 50 for controlling the snow thrower 10, according to an embodiment of the present disclosure. The wireless personal device 50 can be any of a smartphone, a tablet computer, or a laptop computer, or other handheld device. The wireless personal device 50 includes a wireless communication unit 52 (such as a BLUETOOTH or Radio transmission chip) to enable wireless communication between the wireless personal device 50 and the wireless receiver 24B in the control unit 24 of the snow thrower 10. The wireless personal device 50 may include an operating software for operating the wireless personal device 50. The wireless personal device 50 may also include a software program or software application (referred to as "App") for controlling the operation of the snow thrower 10 via the control unit 24 of the snow thrower 10.

In operation, prior to using the App, the wireless communication unit 52 of the wireless personal device 50 is paired with the wireless receiver 24B of the control unit 24 on the snow thrower. The pairing enables exchange of data signals between the wireless personal device 50 and the control unit 24 of the snow thrower 10. The App can be launched on the wireless personal device 50. The App includes a Graphical User Interface (GUI) 53 that is displayed on the display screen of the wireless personal device 50. The GUI 53 of the App has a plurality of input buttons including four drive control buttons (the plurality of arrow buttons) 54A, 54B, 54C and 54D that are activated to drive the snow thrower 10. The up arrow button 54A and down arrow button 54B are used to move the snow thrower forward and reverse, respectively. The left arrow button 54C and right arrow button 54D are used to make left and right turns, respectively. The "speed +/−" buttons 56 are used to increase and decrease the forward speed in gradual increments. The "reverse +/−" buttons 58 are used to increase and decrease the reverse speed in gradual increments. The "Bluetooth" button 60 enables connection between the wireless communication unit ("Bluetooth" enabled) 52 and the "Bluetooth" receiver 24B located inside the control unit 24. Although a "Bluetooth" button 60 is shown used in the GUI 53, the "Bluetooth" button 60 can be replaced by any type of wireless transmission or link button depending on the type of communication (e.g., radio or the like) used between the wireless personal device 50 and the snow thrower 10. A status message 62 is provided below the "Bluetooth" button 60 to indicate the status of the communication between the wireless personal device 50 and the snow thrower 10. The status message 62 below the "Bluetooth" button 60 will change from "Disconnected" to "Connected" when a successful connection is established. The "OFF" button 64 disconnects the communication between the wireless communication unit 52 and the control unit 24. The "Left" button 66 sends a signal to the control unit 24 to command the linear actuator 36 to extend, causing the snow discharge chute to rotate left, while the "Right" button 68 sends a signal to the control unit 24 to command the linear actuator 36 to retract, causing the snow discharge chute to rotate right. Each tap on the Left/Right button extends or retracts the linear actuator by a predetermined distance increment, for example by about 0.5 inches. In addition to the GUI 53, the wireless personal device 50 may also include a display window (not shown) to show a field of view of one or more cameras installed on the snow thrower 10.

Although the wireless personal device 50 is described above as being a GUI-type wireless device, it is also contemplate to provide a remote controller (RC) device such as a joystick, radio transmitter, or a gaming controller that can be programmed to provide the above inputs. In this case, instead of input buttons on the GUI, the remote controller device may be provided with control sticks, dials and/or physical buttons that can be manipulated by a user to control the snow thrower 10. In addition, the remote controller device may also be provided with a display device to display a field of view of one or more cameras installed on the snow thrower 10. In an embodiment, the display device can be for example the display device of a smart phone, a tablet computer, or the like. For example, a user's smart phone can be attached to the RC controller to provide a view of the field to a user while the user is operating the snow thrower 10.

Figure 9:
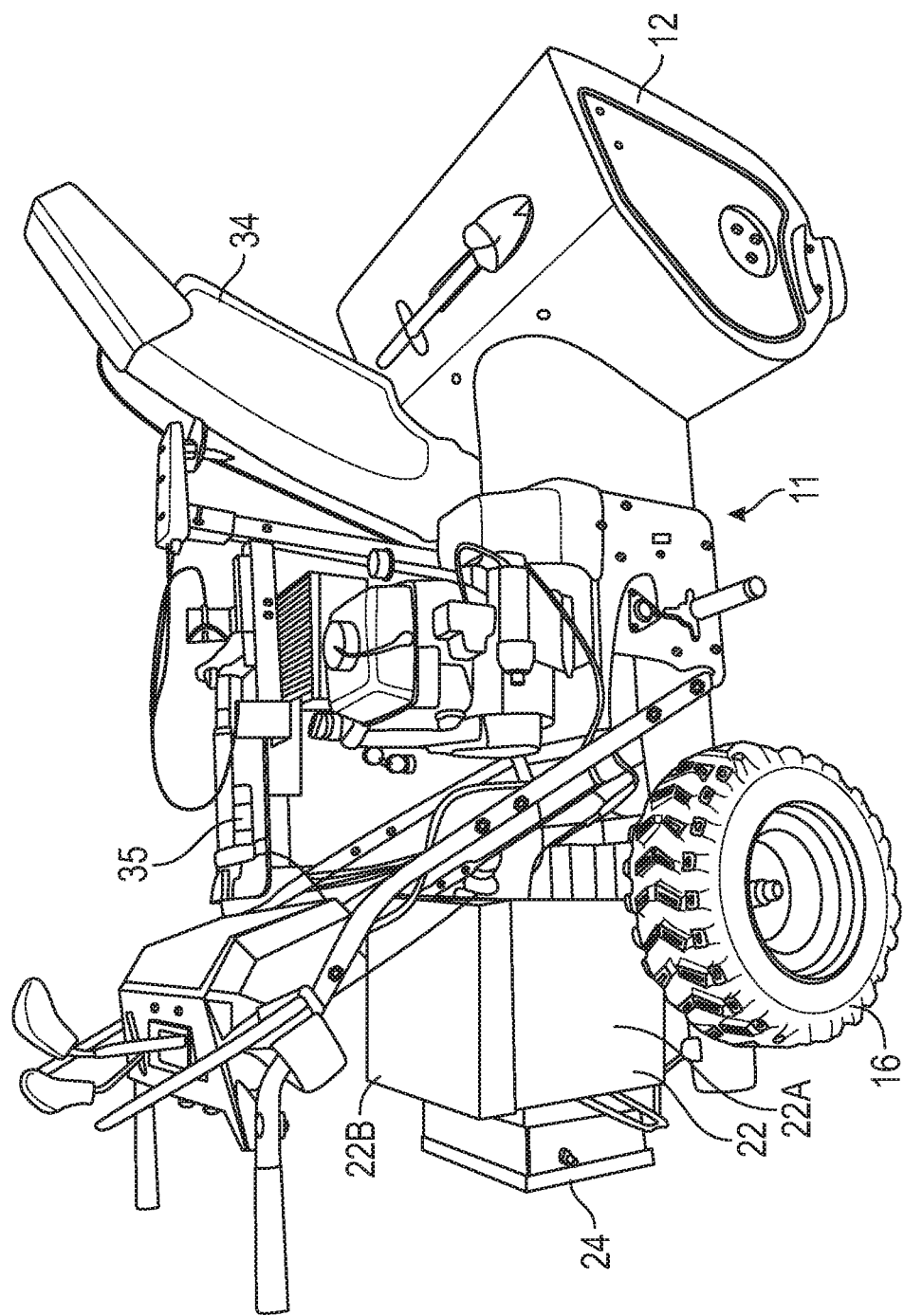
FIG. 9 shows a side view of a remote controlled snow thrower, according to another embodiment of the present disclosure.

FIG. 9 shows a side view of a remote controlled snow thrower, according to another embodiment of the present disclosure. The snow thrower 11 shown in FIG. 9 is similar in many aspects to the snow thrower shown in FIGS. 1-6. Therefore, same reference numerals are used in FIG. 9 to indicate similar components. However, the snow thrower 10 and the snow thrower 11 are different in some aspects. For example, the one or more batteries 22, battery housing 22A with cover 22B are disposed at the rear of the snow thrower 11. For example, a single piece mounting bracket can be used to mount the battery housing 22A to a structure of the snow thrower 11. In addition, the control unit 24 is fastened to the back of the battery housing 22A. The control unit 24 also draws power from the one or more batteries 22. Furthermore, the slider mechanism of the discharge chute rotation mechanism 35 is slimmed down and rendered less bulky.

As it can be appreciated from the above paragraphs, an aspect of the present disclosure is to provide a conversion kit for transforming a manually operable snow thrower into a remotely controllable snow thrower. The conversion kit includes one or more electric motors configured to be mounted to a frame structure of the manually operable snow thrower and configured to be operatively coupled to a plurality of drive wheels or drive tracks of the manually operable snow thrower, the one or more electric motors being configured to drive the plurality of drive wheels or drive tracks.

The conversion kit also includes a control unit configured to be mounted to the frame structure and configured to control the one or more electric motors to drive the plurality of drive wheels or drive tracks, the control unit being further configured to control an orientation of a snow discharge chute of the manually operable snow thrower. The control unit is configured to receive command signals wirelessly from a handheld wireless device of a user so as to remotely control an operation of the manually operable snow thrower so as to transform the manually operable snow thrower into a remotely controllable snow thrower.

The conversion kit also includes a control switch configured to be in communication with the one or more electric motors, the control switch being configured to turn off or turn on electrical power to the one or more electric motors or turn off or turn on command input signals to the electric motors from the control unit. When the switch is turned off, electrical power to the one or more electric motors or the command input signals to the electric motors from the control unit, or both, are turned off and the remotely controllable snow thrower is set for manual operation such that the plurality of drive wheels or drive tracks are set to be driven by an engine of the manually operable snow thrower. When the switch is turned on, the electrical power to the one or more electric motor or the command input signals to the electric motors from the control unit, or both, are turned on and the remotely controllable snow thrower is set for remote control operation such that the plurality of drive wheels or drive tracks are set to be driven by the electric motors.

In an embodiment, the conversion kit includes one or more mounting brackets. The one or more mounting brackets are configured to mount the one or more electric motors to the frame structure. In an embodiment, the control unit includes a micro-controller, a wireless receiver in communication with the micro-controller, and a motor controller in communication with the micro-controller. The wireless receiver is configured to receive command signals from the handheld wireless device. The micro-controller is configured to process the command signals received by the wireless receiver to generate processed signals. The motor controller is configured to receive the processed signals and send motor input signals to the one or more electric motors to drive the one or more electric motors.

In an embodiment, the conversion kit also includes a discharge chute control mechanism configured to orient the snow discharge chute so as to throw snow to a desired location away from the remotely controllable snow thrower. In an embodiment, the discharge chute control mechanism includes a linear actuator and a slider mechanism. The linear actuator is configured to move the slider mechanism, and the slider mechanism is configured to extend or retract a cable attached to the snow discharge chute to orient the snow discharge chute.

In an embodiment, the conversion kit also includes one or more wireless cameras configured to be installed on a structure of the manually operable snow thrower. The one or more wireless cameras are configured to transmit images wirelessly to the user. In an embodiment, the conversion kit includes one or more proximity sensors configured to be installed on a structure of the manually operable snow thrower. The one or more proximity sensors are configured to be connected to the control unit and configured to reorient a travel direction of the snow thrower, cutoff power to the plurality of drive wheels or drive tracks, or trigger an alarm to the user, or any combination thereof.

In an embodiment, the conversion kit further includes one or more lift actuators configured to be coupled to the frame structure of the manually operable snow thrower. The one or more lift actuators are configured to lift the remotely controllable snow thrower to move the remotely controllable snow thrower from a lower position to a higher position. In an embodiment, the one or more lifting actuators comprise a pair of lifting wheels installed on opposing sides of an impeller enclosure of the remotely controllable snow thrower to enable lifting a front end of the remotely controllable snow thrower and storage of the remotely controllable snow thrower.

As it can be appreciated from the above paragraphs, another aspect of the present disclosure it to provide a method of transforming a manually operable snow thrower into a remotely controllable snow thrower. The method includes mounting one or more electric motors to a frame structure of the manually operable snow thrower and operatively coupling the one or more electric motors to a plurality of drive wheels or drive tracks of the manually operable snow thrower, the one or more electric motors being configured to drive the plurality of drive wheels or drive tracks. The method further includes mounting a control unit to the frame structure, the control unit being configured to receive command signals wirelessly from a handheld wireless device of a user so as to remotely control an operation of the manually operable snow thrower so as to transform the manually operable snow thrower into a remotely controllable snow thrower. The method also includes electrically connecting the control unit to the one or more electric motors so as to enable control the one or more electric motors to drive the plurality of drive wheels or drive tracks, and electrically connecting the control unit to a discharge chute control mechanism to enable the control unit to control the discharge chute control mechanism to change an orientation of a snow discharge chute of the manually operable snow thrower. The method also includes enabling turning off or turning on electrical power to the one or more electric motors or turning off or turning on command input signals to the electric motors from the control unit using a switch in communication with the one or more electric motors. The method includes setting for manual operation the remotely controllable snow thrower such that the plurality of drive wheels or drive tracks are set to be driven by an engine of the manually operable snow thrower when the switch is turned off and electrical power to the one or more electric motors or the command input signals to the electric motors from the control unit, or both, are turned off; and setting for remote control operation the remotely controllable snow thrower such that the plurality of drive wheels or drive tracks are set to be driven by the electric motors when the switch is turned on and the electrical power to the one or more electric motor or the command input signals to the electric motors from the control unit, or both, are turned on.

In an embodiment, the method includes mounting the one or more electric motors to the frame structure using one or more mounting brackets. In an embodiment, the method includes orienting using the discharge chute control mechanism the snow discharge chute so as to throw snow to a desired location away from the remotely controllable snow thrower.

In an embodiment, the method includes installing one or more wireless cameras on a structure of the manually operable snow thrower, the one or more wireless cameras being configured to transmit images wirelessly to the user. In an embodiment, the method includes installing one or more proximity sensors on a structure of the manually operable snow thrower, and connecting the one or more proximity sensors to the control unit so as enable reorienting a travel direction of the snow thrower, cutoff power to the plurality of drive wheels or drive tracks, or trigger an alarm to the user, or any combination thereof. In an embodiment, the method includes coupling one or more lift actuators to the frame structure of the manually operable snow thrower to enable lifting the remotely controllable snow thrower to move the remotely controllable snow thrower from a lower position to a higher position, the one or more lifting actuators comprising a pair of lifting wheels installed on opposing sides of an impeller enclosure of the remotely controllable snow thrower to enable lifting a front end of the remotely controllable snow thrower and storage of the remotely controllable snow thrower.

The embodiments illustrated and discussed in this specification are intended only to teach those skilled in the art how to make and use the invention. In describing embodiments of the disclosure, specific terminology is employed for the sake of clarity. However, the disclosure is not intended to be limited to the specific terminology so selected. The above-described embodiments of the disclosure may be modified or varied, without departing from the invention, as appreciated by those skilled in the art in light of the above teachings. It is therefore to be understood that, within the scope of the claims and their equivalents, the invention may be practiced otherwise than as specifically described. For example, it is to be understood that the present disclosure contemplates that, to the extent possible, one or more features of any embodiment can be combined with one or more features of any other embodiment.

I claim:

1. A remote controlled hybrid snow thrower, comprising:
a frame structure;
a plurality of drive wheels or drive tracks mounted to the frame structure;
an auger and an auger enclosure mounted to the frame structure, the auger being configured to remove snow from inside the auger enclosure;
a snow discharge chute mounted to the frame structure and configured to direct snow away from the remote controlled hybrid snow thrower;
an engine mounted to the frame structure and configured to power the auger;
one or more electric motors mounted to the frame structure and operatively coupled to the plurality of drive wheels or drive tracks, the one or more electric motors being configured and arranged to drive the plurality of drive wheels or drive tracks;
a control unit mounted to the frame structure and configured to control the one or more electric motors to drive the plurality of drive wheels or drive tracks and to control an orientation of the snow discharge chute, the control unit being configured to receive command signals wirelessly from a handheld wireless device of a user so as to remotely control an operation of the remote controlled hybrid snow thrower;
a control switch in communication with the one or more electric motors, the control switch being configured to turn off or turn on electrical power to the one or more electric motors or turn off or turn on command input signals to the electric motors from the control unit; and
a discharge chute control mechanism configured to orient the snow discharge chute so as to throw snow to a desired location away from the snow thrower,
wherein when the control switch is turned off, electrical power to the one or more electric motors or the command input signals to the electric motors from the control unit, or both, are turned off and the snow thrower is set for manual operation such that the plurality of drive wheels or drive tracks are set to be driven by the engine, and
wherein when the control switch is turned on, the electrical power to the one or more electric motor or the command input signals to the electric motors from the control unit, or both, are turned on and the snow thrower is set for remote control operation such that the plurality of drive wheels or drive tracks are set to be driven by the electric motors, and
wherein the discharge chute control mechanism includes a linear actuator and a slider mechanism, wherein the linear actuator is configured to move the slider mechanism, wherein the slider mechanism is configured to extend or retract a cable attached to the snow discharge chute to orient the snow discharge chute.

2. The remote controlled hybrid snow thrower according to claim 1, wherein the plurality of drive wheels or drive tracks include a first drive wheel and second drive wheel and the one or more electric motors include a first electric motor configured and arranged to drive the first drive wheel and a second electric motor configured and arranged to drive the second drive wheel.

3. The remote controlled hybrid snow thrower according to claim 1, further comprising one or more batteries configured to provide power to the one or more electric motors.

4. The remote controlled hybrid snow thrower according to claim 3, wherein the one or more batteries are selected from the group consisting of gel batteries, nickel cadmium batteries, lithium-ion batteries, and lead acid batteries.

5. The remote controlled hybrid snow thrower according to claim 1, wherein the engine that is configured to power the auger is a gasoline engine.

6. The remote controlled hybrid snow thrower according to claim 1, wherein the one or more electric motors are mounted to the frame structure using one or more mounting brackets.

7. The remote controlled hybrid snow thrower according to claim 1, further comprising a handle mounted to the frame structure, wherein the control unit is mounted to the handle.

8. The remote controlled hybrid snow thrower according to claim 1, wherein the command signals received by the control unit include direction control signals to control a direction of the snow thrower and speed control signals to control a travel speed of the snow thrower.

9. The remote controlled hybrid snow thrower according to claim 1, wherein the control unit comprises:
a micro-controller, a wireless receiver in communication with the micro-controller, and a motor controller in communication with the micro-controller,
wherein the wireless receiver is configured to receive command signals from the handheld wireless device,
wherein the micro-controller is configured to process the command signals received by the wireless receiver to generate processed signals,
wherein the motor controller is configured to receive the processed signals and send motor input signals to the one or more electric motors to drive the one or more electric motors.

10. The remote controlled hybrid snow thrower according to claim 1, wherein the control unit is further configured to control the discharge chute control mechanism in accordance with command signals received wirelessly from the handheld wireless device of the user.

11. The remote controlled hybrid snow thrower according to claim 1, further comprising one or more wireless cameras installed on a structure of the snow thrower, the one or more wireless cameras being configured to transmit images wirelessly to the user of the snow thrower.

12. The remote controlled hybrid snow thrower according to claim 11, wherein the one or more wireless cameras are configured to transmit images of surroundings of the snow thrower to the handheld wireless device of the user.

13. The remote controlled hybrid snow thrower according to claim 1, further comprising one or more proximity sensors installed on a structure of the snow thrower, the one or more proximity sensors being connected to the control unit of the snow thrower and configured to send a control signal to the control unit to reorient a travel direction of the snow thrower, cutoff power to the plurality of drive wheels or drive tracks, or trigger an alarm to the user, or any combination thereof.

14. The remote controlled hybrid snow thrower according to claim 1, further comprising one or more lift actuators coupled to the frame structure, the one or more lift actuators being configured to lift the snow thrower to move the snow thrower from a lower position to a higher position.

15. The remote controlled hybrid snow thrower according to claim 1, wherein the control unit is configured to receive command signals wirelessly from a handheld wireless device of a user so as to remotely control an operation of the remote controlled hybrid snow thrower so as to transform operation from a manually operable snow thrower into a remotely controllable snow thrower.

16. A remote controlled hybrid snow thrower, comprising:
a frame structure;
a plurality of drive wheels or drive tracks mounted to the frame structure;
an auger and an auger enclosure mounted to the frame structure, the auger being configured to remove snow from inside the auger enclosure;
a snow discharge chute mounted to the frame structure and configured to direct snow away from the remote controlled hybrid snow thrower;
an engine mounted to the frame structure and configured to power the auger;
one or more electric motors mounted to the frame structure and operatively coupled to the plurality of drive wheels or drive tracks, the one or more electric motors being configured and arranged to drive the plurality of drive wheels or drive tracks;
a control unit mounted to the frame structure and configured to control the one or more electric motors to drive the plurality of drive wheels or drive tracks and to control an orientation of the snow discharge chute, the control unit being configured to receive command signals wirelessly from a handheld wireless device of a user so as to remotely control an operation of the remote controlled hybrid snow thrower;
a control switch in communication with the one or more electric motors, the control switch being configured to turn off or turn on electrical power to the one or more electric motors or turn off or turn on command input signals to the electric motors from the control unit; and
a stabilization wheel provided between the plurality of drive wheels or drive tracks mounted to the frame structure, the stabilization wheel being configured to be adjustable in height to facilitate lifting and storage of the snow thrower;
wherein when the control switch is turned off, electrical power to the one or more electric motors or the command input signals to the electric motors from the control unit, or both, are turned off and the snow thrower is set for manual operation such that the plurality of drive wheels or drive tracks are set to be driven by the engine, and
wherein when the control switch is turned on, the electrical power to the one or more electric motor or the command input signals to the electric motors from the control unit, or both, are turned on and the snow thrower is set for remote control operation such that the plurality of drive wheels or drive tracks are set to be driven by the electric motors.

17. A remote controlled hybrid snow thrower, comprising:
a frame structure;
a plurality of drive wheels or drive tracks mounted to the frame structure;
an auger and an auger enclosure mounted to the frame structure, the auger being configured to remove snow from inside the auger enclosure;
a snow discharge chute mounted to the frame structure and configured to direct snow away from the remote controlled hybrid snow thrower;
an engine mounted to the frame structure and configured to power the auger;
one or more electric motors mounted to the frame structure and operatively coupled to the plurality of drive wheels or drive tracks, the one or more electric motors being configured and arranged to drive the plurality of drive wheels or drive tracks;
a control unit mounted to the frame structure and configured to control the one or more electric motors to drive the plurality of drive wheels or drive tracks and to control an orientation of the snow discharge chute, the control unit being configured to receive command signals wirelessly from a handheld wireless device of a user so as to remotely control an operation of the remote controlled hybrid snow thrower;
a control switch in communication with the one or more electric motors, the control switch being configured to turn off or turn on electrical power to the one or more electric motors or turn off or turn on command input signals to the electric motors from the control unit; and
one or more lift actuators coupled to the frame structure, the one or more lift actuators being configured to lift the snow thrower to move the snow thrower from a lower position to a higher position,
wherein when the control switch is turned off, electrical power to the one or more electric motors or the command input signals to the electric motors from the control unit, or both, are turned off and the snow thrower is set for manual operation such that the plurality of drive wheels or drive tracks are set to be driven by the engine, wherein when the control switch is turned on, the electrical power to the one or more electric motor or the command input signals to the electric motors from the control unit, or both, are turned on and the snow thrower is set for remote control operation such that the plurality of drive wheels or drive tracks are set to be driven by the electric motors, and wherein the one or more lifting actuators comprise a pair of lifting wheels installed on opposing sides of an impeller enclosure of the snow thrower to enable lifting a front end of the snow thrower and storage of the snow thrower.

18. The remote controlled hybrid snow thrower according to claim 17, wherein the pair of lifting wheels are configured to be lowered or raised as needed using a remote controlled tracked linear actuators to enable lifting the front end of the snow thrower.

19. A conversion kit for transforming a manually operable snow thrower into a remotely controllable snow thrower, the conversion kit comprising:

one or more electric motors configured to be mounted to a frame structure of the manually operable snow thrower and configured to be operatively coupled to a plurality of drive wheels or drive tracks of the manually operable snow thrower, the one or more electric motors being configured to drive the plurality of drive wheels or drive tracks;

a control unit configured to be mounted to the frame structure and configured to control the one or more electric motors to drive the plurality of drive wheels or drive tracks, the control unit being further configured to control an orientation of a snow discharge chute of the manually operable snow thrower, the control unit being configured to receive command signals wirelessly from a handheld wireless device of a user so as to remotely control an operation of the manually operable snow thrower so as to transform the manually operable snow thrower into a remotely controllable snow thrower;

a control switch configured to be in communication with the one or more electric motors, the control switch being configured to turn off or turn on electrical power to the one or more electric motors or turn off or turn on command input signals to the electric motors from the control unit; and a discharge chute control mechanism configured to orient the snow discharge chute so as to throw snow to a desired location away from the remotely controllable snow thrower, wherein when the switch is turned off, electrical power to the one or more electric motors or the command input signals to the electric motors from the control unit, or both, are turned off and the remotely controllable snow thrower is set for manual operation such that the plurality of drive wheels or drive tracks are set to be driven by an engine of the manually operable snow thrower, and wherein when the switch is turned on, the electrical power to the one or more electric motor or the command input signals to the electric motors from the control unit, or both, are turned on and the remotely controllable snow thrower is set for remote control operation such that the plurality of drive wheels or drive tracks are set to be driven by the electric motors, and wherein the discharge chute control mechanism includes a linear actuator and a slider mechanism, wherein the linear actuator is configured to move the slider mechanism, wherein the slider mechanism is configured to extend or retract a cable attached to the snow discharge chute to orient the snow discharge chute.

20. The conversion kit according to claim 19, further comprising one or more mounting brackets, wherein the one or more mounting brackets are configured to mount the one or more electric motors to the frame structure.

21. The conversion kit according to claim 20, wherein the one or more mounting brackets comprises a frame mounting bracket and a pair of motor brackets.

22. The conversion kit according to claim 19, wherein the control unit comprises:

a micro-controller, a wireless receiver in communication with the micro-controller, and a motor controller in communication with the micro-controller, wherein the wireless receiver is configured to receive command signals from the handheld wireless device, wherein the micro-controller is configured to process the command signals received by the wireless receiver to generate processed signals, wherein the motor controller is configured to receive the processed signals and send motor input signals to the one or more electric motors to drive the one or more electric motors.

23. The conversion kit according to claim 19, further comprising one or more wireless cameras configured to be installed on a structure of the manually operable snow thrower, the one or more wireless cameras being configured to transmit images wirelessly to the user.

24. The conversion kit according to claim 19, further comprising one or more proximity sensors configured to be installed on a structure of the manually operable snow thrower, the one or more proximity sensors being configured to be connected to the control unit and configured to send a control signal to the control unit to reorient a travel direction of the snow thrower, cutoff power to the plurality of drive wheels or drive tracks, or trigger an alarm to the user, or any combination thereof.

25. A conversion kit for transforming a manually operable snow thrower into a remotely controllable snow thrower, the conversion kit comprising:

one or more electric motors configured to be mounted to a frame structure of the manually operable snow thrower and configured to be operatively coupled to a plurality of drive wheels or drive tracks of the manually operable snow thrower, the one or more electric motors being configured to drive the plurality of drive wheels or drive tracks;

a control unit configured to be mounted to the frame structure and configured to control the one or more electric motors to drive the plurality of drive wheels or drive tracks, the control unit being further configured to control an orientation of a snow discharge chute of the manually operable snow thrower, the control unit being configured to receive command signals wirelessly from a handheld wireless device of a user so as to remotely control an operation of the manually operable snow thrower so as to transform the manually operable snow thrower into a remotely controllable snow thrower;

a control switch configured to be in communication with the one or more electric motors, the control switch being configured to turn off or turn on electrical power to the one or more electric motors or turn off or turn on command input signals to the electric motors from the control unit; and one or more lift actuators configured to be coupled to the frame structure of the manually operable snow thrower, the one or more lift actuators being configured to lift the remotely controllable snow thrower to move the remotely controllable snow thrower from a lower position to a higher position, wherein the one or more lifting actuators comprise a pair of lifting wheels installed on opposing sides of an impeller enclosure of the remotely controllable snow thrower to enable lifting a front end of the remotely controllable snow thrower and storage of the remotely controllable snow thrower, wherein when the switch is turned off, electrical power to the one or more electric motors or the command input signals to the electric motors from the control unit, or both, are turned off and the remotely controllable snow thrower is set for manual operation such that the plurality of drive wheels or drive tracks are set to be driven by an engine of the manually operable snow thrower, and wherein when the switch is turned on, the electrical power to the one or more electric motor or the command input signals to the electric motors from the control unit, or both, are turned on and the remotely controllable snow thrower is set for remote control operation such that the plurality of drive wheels or drive tracks are set to be driven by the electric motors.

26. A method of transforming a manually operable snow thrower into a remotely controllable snow thrower, the method comprising:

mounting one or more electric motors to a frame structure of the manually operable snow thrower and operatively coupling the one or more electric motors to a plurality of drive wheels or drive tracks of the manually operable snow thrower, the one or more electric motors being configured to drive the plurality of drive wheels or drive tracks;

mounting a control unit to the frame structure, the control unit being configured to receive command signals wirelessly from a handheld wireless device of a user so as to remotely control an operation of the manually operable snow thrower so as to transform the manually operable snow thrower into a remotely controllable snow thrower;

electrically connecting the control unit to the one or more electric motors so as to enable control the one or more electric motors to drive the plurality of drive wheels or drive tracks;

electrically connecting the control unit to a discharge chute control mechanism to enable the control unit to control the discharge chute control mechanism to change an orientation of a snow discharge chute of the manually operable snow thrower; and enabling turning off or turning on electrical power to the one or more electric motors or turning off or turning on command input signals to the electric motors from the control unit using a switch in communication with the one or more electric motors;

setting for manual operation the remotely controllable snow thrower such that the plurality of drive wheels or drive tracks are set to be driven by an engine of the manually operable snow thrower when the switch is turned off and electrical power to the one or more electric motors or the command input signals to the electric motors from the control unit, or both, are turned off; and setting for remote control operation the remotely controllable snow thrower such that the plurality of drive wheels or drive tracks are set to be driven by the electric motors when the switch is turned on and the electrical power to the one or more electric motor or the command input signals to the electric motors from the control unit, or both, are turned on; and coupling one or more lift actuators to the frame structure of the manually operable snow thrower to enable lifting the remotely controllable snow thrower to move the remotely controllable snow thrower from a lower position to a higher position, the one or more lifting actuators comprising a pair of lifting wheels installed on opposing sides of an impeller enclosure of the remotely controllable snow thrower to enable lifting a front end of the remotely controllable snow thrower and storage of the remotely controllable snow thrower.

27. The method according to claim 26, further comprising mounting the one or more electric motors to the frame structure using one or more mounting brackets.

28. The method according to claim 26, further comprising orienting using the discharge chute control mechanism the snow discharge chute so as to throw snow to a desired location away from the remotely controllable snow thrower.

29. The method according to claim 26, further comprising installing one or more wireless cameras on a structure of the manually operable snow thrower, the one or more wireless cameras being configured to transmit images wirelessly to the user.

30. The method according to claim 26, further comprising installing one or more proximity sensors on a structure of the manually operable snow thrower, and connecting the one or more proximity sensors to the control unit so as enable reorienting a travel direction of the snow thrower, cutoff power to the plurality of drive wheels or drive tracks, or trigger an alarm to the user, or any combination thereof.

* * * * *